United States Patent [19]

Nozawa et al.

[11] Patent Number: 5,234,527
[45] Date of Patent: Aug. 10, 1993

[54] LIQUID LEVEL DETECTING DEVICE AND A PROCESSING APPARATUS

[75] Inventors: Toshihisa Nozawa, Yokohama; Junichi Arami, Hachioji; Yukimasa Yoshida, Yokohama; Keiji Horioka, Kawasaki, all of Japan

[73] Assignees: Tokyo Electron Limited, Tokyo; Kabushiki Kaisha Toshiba, Kawasaki, both of Japan

[21] Appl. No.: 731,473

[22] Filed: Jul. 17, 1991

[30] Foreign Application Priority Data

Jul. 20, 1990 [JP] Japan ................... 2-192470

[51] Int. Cl.$^5$ ............................................. B44C 1/22
[52] U.S. Cl. ..................... 156/345; 156/643; 156/646; 156/627; 156/626; 118/663; 118/712; 118/723; 118/724; 73/295
[58] Field of Search ............... 156/345, 643, 646, 626, 156/627; 73/295, 292; 118/723, 725, 663, 712, 724

[56] References Cited

U.S. PATENT DOCUMENTS

| | | | |
|---|---|---|---|
| 4,187,723 | 2/1980 | Golden et al. | 73/295 |
| 4,404,809 | 9/1983 | Johnson et al. | 73/295 X |
| 4,956,043 | 9/1990 | Kanetomo et al. | 156/345 |

Primary Examiner—Thi Dang
Attorney, Agent, or Firm—Oblon, Spivak, McClelland, Maier & Neustadt

[57] ABSTRACT

A liquid level detecting device used in a vacuum processing apparatus, the device comprising a liquid container section, an inlet pipe for liquid supply connected to the liquid container section, and outlet pipe for discharging the liquid when the liquid in the liquid container section overflows a predetermined liquid level, a temperature measurement terminal provided in the liquid container section, for detecting the temperature of the liquid in the container section, means for heating or cooling the temperature measurement terminal, and a liquid level detecting section for detecting the surface level of the liquid on the basis of the difference between two temperatures of the liquid measured when the heating or cooling means is in contact with the liquid and when not in contact.

18 Claims, 3 Drawing Sheets

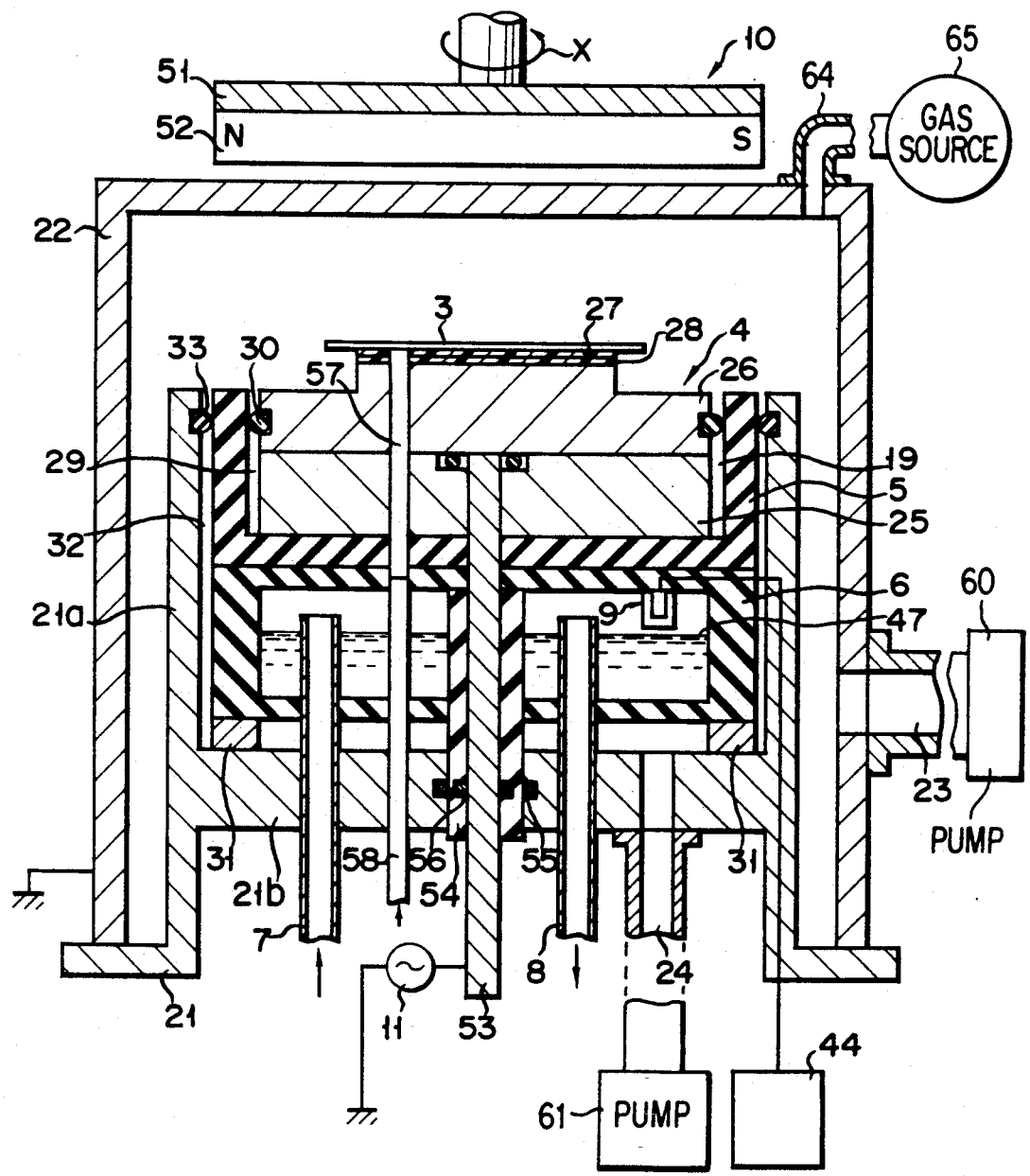
F I G. 1

LIQUID LEVEL DETECTING DEVICE AND A PROCESSING APPARATUS

BACKGROUND OF THE INVENTION

1. Field of the Invention

The present invention relates to a liquid level detecting device and a processing apparatus using the same, and more particularly, to a liquid level sensing device used in a plasma apparatus, CVD apparatus, sputtering apparatus, ion implantation apparatus, etc.

2. Description of the Related Art

It is ascertained that highly anisotropic etching can be effected by cooling a wafer, for use as a to-be-processed object, in a plasma etching apparatus, for example. The cooling temperature of the wafer tends to be lower.

A very-low-temperature medium, such as liquid nitrogen, must be used to cool the wafer to a lower temperature.

In developing an apparatus in which a cooling jacket for holding liquid nitrogen is arranged adjacent to a susceptor for supporting the wafer, however, it was revealed that control for maintaining a predetermined surface level for the liquid nitrogen in the cooling jacket is very difficult.

Since the liquid nitrogen is a very-low-temperature medium of −196° C., a mechanical liquid level sensor cannot be reliable enough to detect the liquid level satisfactorily by detecting mechanical contact or non-contact with the liquid, due to restrictions in temperature compensation.

SUMMARY OF THE INVENTION

The object of the present invention is to provide a high-reliability liquid level sensing device capable of detecting the surface level of a subject liquid, such as a low- or high-temperature liquid, by temperature measurement without depending on mechanical contact with the liquid, and a processing apparatus using the same.

According to an aspect of the present invention, there is provided a processing apparatus for subjecting a to-be-processed object to predetermined processing in a vacuum atmosphere.

According to another aspect of the present invention, there is provided a plasma etching apparatus for plasma-etching a semiconductor wafer.

According to still another aspect of the invention, there is provided a liquid level detecting device for detecting the surface level of liquid.

The processing apparatus of the invention comprises: a vacuum chamber maintained at a predetermined vacuum; a supporting table located in the vacuum chamber, for supporting an object; a liquid container section located under the supporting table, for containing liquid for maintaining the object at a desired temperature; a liquid level detecting device located in the vacuum chamber, including temperature-change detecting means for detecting the temperature of the liquid contained in the liquid container section and also the temperature of another thing, and designed to detect temperature changes in the liquid and the other thing from the temperatures detected by the temperature-change detecting means, thereby to determine those parts of the liquid and the other thing and, hence, detect the surface level of the liquid; and processing means for processing the object maintained at the desired temperature by the liquid.

The plasma etching apparatus comprises: a vacuum chamber maintained at a predetermined vacuum; a supporting table located in the vacuum chamber, for supporting the object; a liquid container section located under the supporting table, for containing liquid for maintaining the object at a desired temperature; a liquid level detecting device located in the vacuum chamber including temperature-change detecting means for detecting the temperature of the liquid contained in the liquid container section and also the temperature of another thing, and designed to detect temperature changes in the liquid and the other thing from the temperatures detected by the temperature-change detecting means, thereby to determine those parts of the liquid and the other thing and, hence, detect the surface level of the liquid; and plasma generating means for generating plasma of etching gas around the object.

The liquid level detecting device of the invention comprises: temperature-change detecting means for detecting the temperature of liquid contained in a liquid container section and also the temperature of another thing, thereby detecting temperature changes in the liquid and the other thing and determining the surface level of the liquid in the liquid container section.

Additional objects and advantages of the invention will be set forth in the description which follows, and in part will be obvious from the description, or may be learned by practice of the invention. The objects and advantages of the invention may be realized and obtained by mean of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a schematic sectional view of a magnetron plasma etching apparatus to which the present invention is applied;

DETAILED DESCRIPTION OF THE INVENTION

Figure 2:
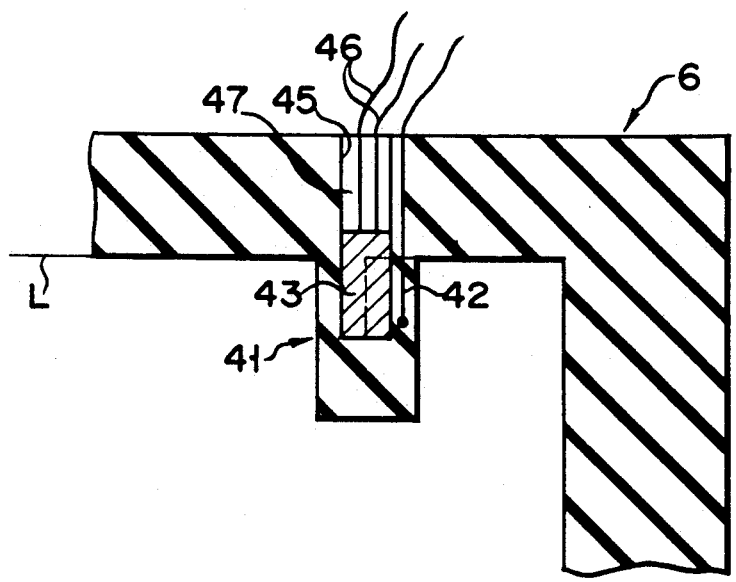
FIG. 2 is a schematic view for illustrating a temperature measurement terminal of a device according to the invention.

According to the present invention, the surface level of a low-temperature liquid is detected in the following manner.

(1) While temperature adjusting means, such as a heating element for heating a temperature measurement terminal or a cooling element, is in contact with the subject liquid, supplied heat is removed by the low-temperature liquid, so that the temperature detected by means of the terminal is substantially equal to that of the liquid itself.

(2) If the surface level of the low-temperature liquid is lowered below that of the temperature adjusting means, however, the adjusting means cannot be cooled directly by the liquid. Accordingly, the amount of heat removed is reduced, and the temperature measured by means of the temperature measurement terminal is raised due to the heat supplied from the temperature adjusting means.

Thus, the low-temperature liquid level can be detected by a difference in temperature measured by means of the temperature measurement terminal. The surface level of a high-temperature liquid can be also detected with the same result as that of the low-temperature liquid by cooling the terminal by means of the temperature adjusting means.

In the present invention, the temperature controlled by means of the temperature adjusting means may be any one which enables the detection of the liquid level based on a substantial temperature difference greater than the variation of the temperature of the subject liquid. If only the temperature measurement terminal is used, in contrast with this, there is no noticeable temperature difference between the case where the temperature measurement terminal is in contact with the subject liquid and the case where it is not, so that the liquid level cannot be detected with reliability.

DETAILED DESCRIPTION OF THE PREFERRED EMBODIMENTS

Example

FIG. 1 is a schematic view showing a plasma etching apparatus which uses a liquid level detecting device according to an embodiment of the present invention. The plasma etching apparatus comprises a vacuum chamber 1, a supporting table 4 in the chamber 1 for supporting a wafer 3, an electrically insulating ceramic receiver (supporting table holding section) 5, and a liquid nitrogen container (liquid holding section) 6 underlying the receiver 5. The etching apparatus further comprises an inlet pipe 7 connected to the container 6 and used to supply liquid nitrogen to the container 6, an outlet pipe 8 connected to the container 6 and adapted to discharge the liquid nitrogen when the liquid in the container 6 overflows a predetermined liquid level, a liquid level detecting device 9, a magnet section 10 disposed over the chamber 1, and a radio-frequency (RF) power source 11.

The vacuum chamber 1 includes a lower chamber 21 and an upper chamber 22 whose lower end side is fixedly connected to the lower chamber 21. The lower chamber 21 is composed of a side wall 21a, which covers the respective side wall portions of the receiver 5 and the liquid nitrogen container 6, and a supporting wall 21b bearing the bottom face of the receiver 5. The upper chamber 22 is in the form of a hollow cylinder which surrounds the side wall 21a of the lower chamber 21. A first exhaust port 23 is formed at the lower portion of the side wall of the upper chamber 22, one end of the port 23 being connected to an exhaust pump 60. The vacuum chamber 1 is evacuated through the exhaust port 23. The chamber 1 is designed so that its internal pressure can be reduced to about 10-6 Torr. A second exhaust port 24 is formed in the supporting wall 21b of the lower chamber 21, one end of the port 24 being connected to an exhaust pump 60.

The supporting table 4 is provided with a first susceptor 25 and a second susceptor 26 removably fixed to the upper surface of the first susceptor 25. The wafer 3 is fixedly mounted over the second susceptor 26 with an electrostatic attraction sheet 27 between them. In this mounting method, the wafer 3 is attracted and fixed by means of Coulomb force based on an electrostatic chucking system. A conductive copper sheet 28, which is connected electrically to a DC power source (not shown), is embedded in the attraction sheet 27.

The respective side and bottom faces of the first and second susceptors 25 and 26 are covered by the receiver 5. A first gap 29 is defined between the inner side wall surface of the receiver 5 and the respective side faces of the susceptors 25 and 26. The upper end side of the gap 29 is sealed by means of a first O-ring seal 30.

The liquid nitrogen container 6 is mounted over the supporting wall 21b of the lower chamber 21 with an electrically insulating ceramic ring-shaped member 31 between them. A second gap 32 is defined between the inner surface of the side wall 21a of the lower chamber 21 and respective outer wall surfaces of the receiver 5 and the liquid nitrogen container 6. The upper end side of the second gap 32 is sealed by means of a second O-ring seal 33. The seals 30 and 33 are used to define the first and second gaps 29 and 32 as vacuum adiabatic layers. The gaps 29 and 32 can be evacuated through the second exhaust port 24. The receiver 5 and the ring-shaped member 31 are formed individually having holes, by means of which the first and second gaps 29 and 32 communicate with each other.

The following is a description of the liquid level detecting device 9. The device 9 comprises a liquid level sensor 41, which includes a thermocouple 42 for use as a temperature measurement terminal and a heater 43 for use as a heating element.

The bottom face of the inner wall of the liquid nitrogen container 6 is, for example, porous so that nuclear boiling can be caused, and that its temperature can be kept at $-196°$ C. The inlet pipe 7 is used to supply the liquid nitrogen to the container 6. The outlet pipe 8 is used to discharge the liquid nitrogen overflowing the predetermined liquid level.

As shown in FIG. 2, the liquid level sensor 41 is inserted in an insertion section (not shown) which opens to the top portion of the liquid nitrogen container 6. The distal end of the thermocouple 42 is situated in a position somewhat lower than the level (level L) of the inner wall surface of the top portion of the container 6. The whole thermocouple 42 except that portion thereof near the region for temperature measurement is coated for insulation. In this state, the thermocouple 42 is connected to a liquid level detecting section 44 through the container 6 and the lower chamber 21. An opening 45 is formed in the top portion of the container 6 so as to be situated near the insertion section, and the heater 43 is fitted in the opening 45. Terminals 46, which are coated for insulation, are connected to the heater 43. Electric power of about 10 to 100 W is supplied to the heater 43. A vacuum grease 47 is contained in the opening 45 so that the terminals 46 are buried therein. In order to secure a predetermined cooling capacity, the surface of the liquid nitrogen in the liquid nitrogen container 6 should always be kept on the predetermined level, and the lowest liquid level is detected by means of the liquid level sensor 41.

The magnet section 10 serves to apply a magnetic field between the upper chamber 22 which functions as a first electrode or upper electrode, and the second susceptor 26 which functions as a second electrode or lower electrode opposing the first electrode. The magnetic field extends parallel to the surface of the wafer. The section 10 includes a supporting member 51 horizontally extending right over the upper chamber 22, a permanent magnet 52 supported by the member 51, and a motor (not shown) for rotating the magnet 52 in the direction of arrow X shown in FIG. 1. A magnetic field is generated which extends at right angles to the magnetic field applied between the upper and lower electrodes, thereby making it possible to cause magnetron discharge.

The RF power source 11 is connected to the second susceptor 26 by means of a conductive rod 53. The rod 53 is inserted in an insulating cylinder member 54, which penetrates the supporting wall 21b and the bottom of the liquid nitrogen container 6, and reaches the inner wall surface of the top portion of the container 6. A third O-ring seal 55 is interposed between the cylinder member 54 and the supporting wall 21b, and a fourth O-ring seal 56 between the inner wall surface of the member 54 and the rod 53.

In FIG. 1, numeral 57 designates a gas hole which penetrates the second susceptor 26, first susceptor 25, receiver 5, and liquid nitrogen container 6, which are situated under the wafer 3. A pipe 58, through which a heat transfer gas is supplied to the back side of the wafer 3, penetrates the supporting wall 21b and the container 6, and communicates with the gas hole 57. Although the heat transfer gas used is not limited to a specific type, it should preferably be one with high thermal conductivity for the sake of its purpose, e.g., He, $O_2$, Ar, $N_2$, etc., especially He. This is because He, $O_2$, Ar, $N_2$, and the like do not adversely influence the etching reaction.

The operation of the magnetron etching apparatus, described above, will now be described.

First, the wafer 3 is loaded from a load-lock chamber onto the electrostatic attraction sheet 27. Next, a high voltage of, e.g., 2 KV is applied between the upper chamber 26 and the conductive sheet 28.

Then, the vacuum chamber 1 is evacuated to 0.1 m Torr to 10 m Torr, for example, about $1 \times 10^{-3}$ Torr, for example, and an etching gas, e.g., $O_2$ gas, CI gas, or $FS_6$ gas, is introduced into the chamber 3, at the flow rate of, e.g., 50 cc/s at normal temperature and pressure, through a gas inlet port 64 in the top wall of the upper chamber 22. In this state, RF power from the RF power source 11 is supplied between the top wall of the chamber 22, for use as the upper electrode, and the second susceptor 26 as the lower electrode. Thus, plasma is generated between the two electrodes. As a result, radicals and ions are produced, so that the surface of the wafer 3 is subjected to reactive ion etching. In this case, a magnetic force from the permanent magnet 52 causes electrons between the electrodes to undergo cyclotron motion, so that plasmatic conversion of the etching gas is accelerated, and a high etching speed of 1 μm/min can be obtained despite the use of a relatively low pressure of $10^{-2}$ to $10^{-3}$ Torr. As plasma is generated, electrostatic chucking is achieved, whereby the wafer is attracted to the electrostatic attraction sheet 27 by virtue of Coulomb force.

In executing the magnetron plasma etching described above, the wafer 3 is cooled to, for example, about $-60°$ C. The liquid nitrogen container 6 is provided at the cooling section, and the wafer 3 is cooled by using the liquid nitrogen at a low temperature of $-196°$ C.

In order to secure the predetermined cooling capacity of the liquid nitrogen, the surface of the liquid nitrogen should always be kept on the predetermined level or above. If the liquid level is lowered, the liquid nitrogen must be resupplied through the inlet pipe 7. The liquid level detection for this replenishment is effected by means of the liquid level sensor 41.

The heater 43 is always supplied with current through the terminals 46, so that the thermocouple 42 is heated by means of the heater 43. If the heater 43 is directly in contact with the liquid nitrogen, however, the heat supplied by means of the heater 43 is continually removed by the liquid nitrogen at the temperature as low as $-196°$ C., and the temperature measured by means of the thermocouple 42 is substantially equal to the temperature of the liquid nitrogen itself. Thus, as long as the measured temperature is substantially equal to the temperature of the liquid nitrogen itself, the surface of the liquid nitrogen can be kept on the proper level.

If the surface level of the liquid nitrogen becomes lower than the set position of the liquid level sensor 41 so that the heater 43 is not in contact with the liquid, the heat supplied by means of the heater 43 cannot be removed directly by the liquid nitrogen. Even though the heat is removed by the ambient atmosphere, therefore, the amount of removed heat is much smaller than in the case of the direct cooling by means of the liquid nitrogen itself. Thus, the balance between the amount of heat supplied by means of the heater 43 and the amount of removed heat is destroyed, so that the temperature detected by means of the thermocouple 42 rises correspondingly. If the amount of supplied heat is predetermined, the difference in temperature, attributable to the difference in liquid level, is greater than the variation of the measured temperature of the liquid nitrogen. Based o this remarkable temperature difference, therefore, the fall of the surface level of the liquid nitrogen below the lowest level can be securely detected.

Ideally, in cooling the wafer 3, heat is exchanged only between the liquid nitrogen container 6, for use as the cooling section, and the wafer 3, and heat exchange with other members is minimized. By doing this, the wafer 3 can be cooled efficiently. Thus, the lower chamber 21, in particular, can be prevented from being cooled, and a reaction product can be prevented from adhering to the low-temperature region. In the present embodiment, the first gap is defined between the respective side faces of the susceptors 25 and 26 and the inner side wall surface of the receiver 5, and the second gap 32 is defined on the side of the inner surface of the side wall 21a of the lower chamber 21. Thus, fixed heat conduction between the lower chamber 21 and the first and second susceptors 25 and 26 or the liquid nitrogen container 6. The respective upper portions of the first and second gaps 29 and 32 are sealed by means of the first and second O-ring seals 30 and 33, and the second exhaust port 24 enables the gaps 29 and 32 to function as the vacuum adiabatic layers. In consequence, the adiabatic layers prevent heat convection in the gaps 29 and 32, so that a satisfactory adiabatic effect can be obtained.

In the present embodiment, moreover, the first and second gaps 29 and 32 are evacuated through the second exhaust port 24, besides the first exhaust port 23 through which the chamber is evacuated. Therefore, the reaction product scattering in the vacuum chamber is discharged along an exhaust path of the first exhaust port 23, so that it can be prevented from adhering to those wall surfaces which face the gaps 29 and 32.

Figure 3:
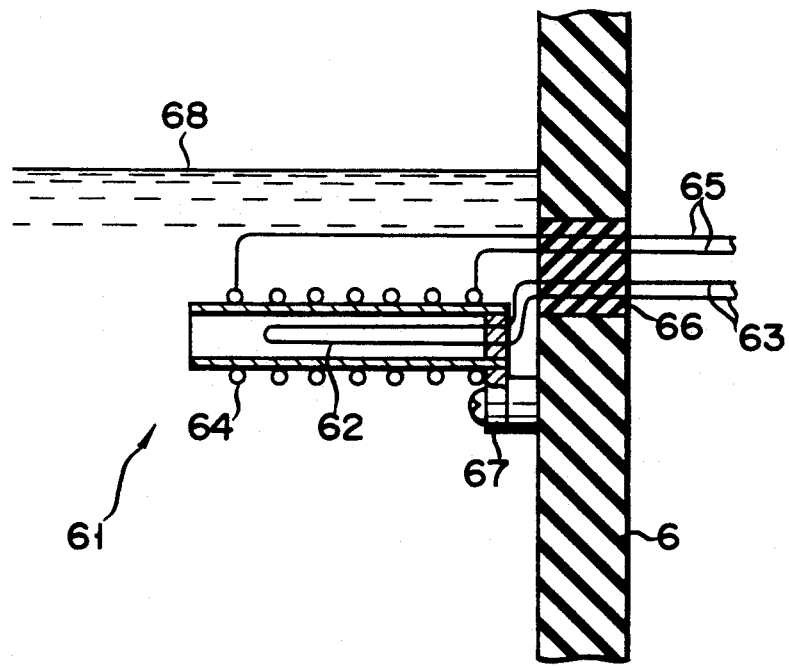
FIG. 3 is a schematic view for illustrating an alternative temperature measurement terminal of the device of the invention.

In the embodiment described above, the liquid level sensor is mounted on the top portion of the liquid nitrogen container. Alternatively, however, the sensor may be attached to the inner side wall of the liquid nitrogen container 6, as shown in FIG. 3. In FIG. 3, the liquid level sensor 61 includes a thermocouple 62, and first terminals 63 connected to the thermocouple 62 are exposed to the outside. A heater 64 of an electric resistance heating type is arranged in the form of a ring around the thermocouple 62. Second terminals 65, which are connected to the heater 64, are attached to the outside of the container 6. The first and second terminals 63 and 65 are supported by means of a terminal inlet member 66 which is built in the side wall of the liquid nitrogen container 6 in a liquid-tight manner. The thermocouple 62 and the heater 64 are mounted on the inner side wall of the container 6 by means of a fitting member 67. The liquid level sensor 61 has a diameter of about 2 mm. Numeral 68 designates the surface of the liquid nitrogen.

Although the liquid nitrogen is used in the embodiment described above, it may be replaced with a fron-based liquid, such as R14, or water.

Figure 4:
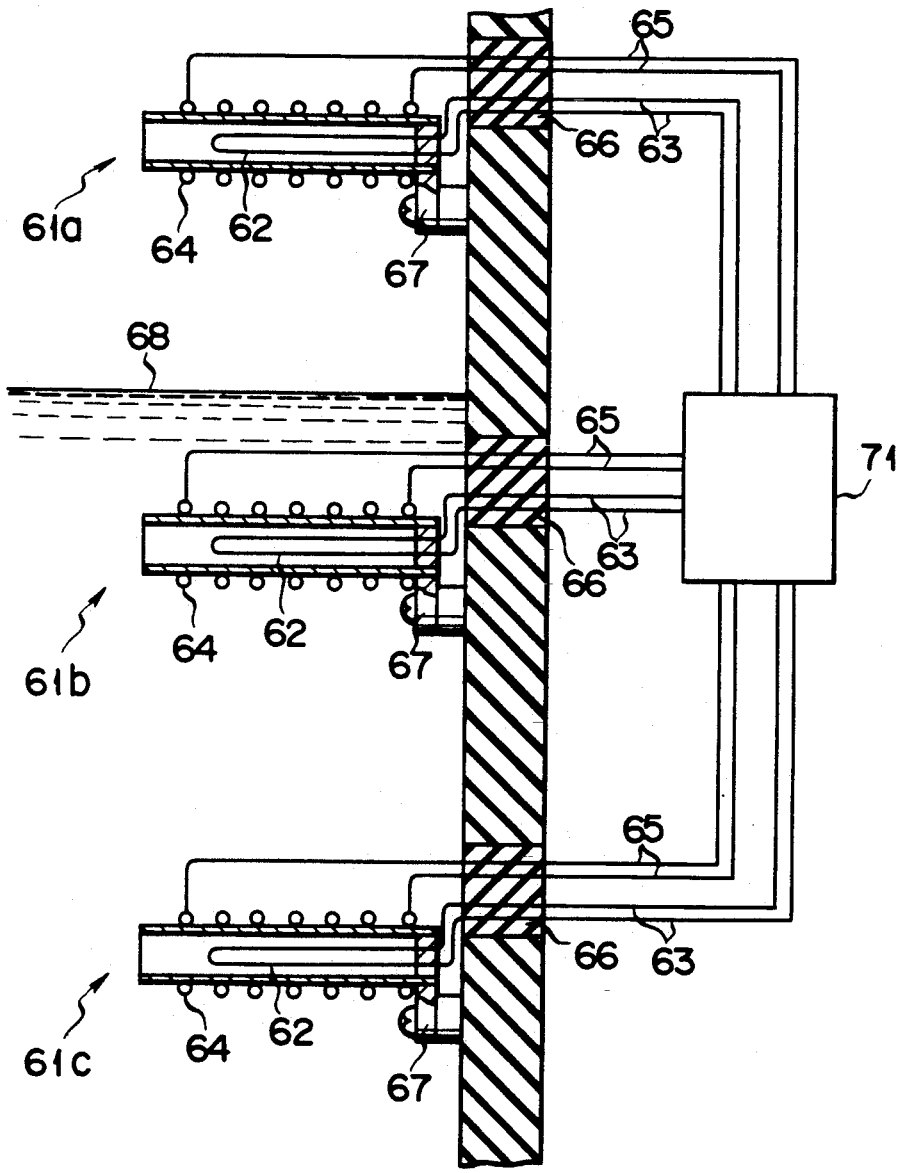
FIG. 4 is a diagram illustrating how a plurality of temperature measuring terminals is used in the device according to the invention.

The embodiment described above has only one liquid level sensor. According to the invention, two or more liquid level sensors can be used. For example, as is shown in FIG. 4, three liquid level sensors 61a, 61b, and 61c, each containing a sensing element (e.g., a thermocouple), are spaced apart in the vertical direction by a relatively short distance. Each of the liquid level sensors 61a, 61b, and 61c has a first terminal 63 and a second terminal 65, both connected to a CPU (Central Processing Unit) 71. The more liquid level sensors used, the more accurately the surface level of the liquid can be determined.

Although the liquid level sensor used in the foregoing embodiment is of a fixed type, moreover, it may be replaced with one of a moving type.

The present invention may be also utilized for the detection of the surface level of a high-temperature liquid. In this case, the temperature measurement terminal is cooled, and a remarkable temperature difference is detected on the basis of a difference in liquid level. The the surface level of the high-temperature liquid can be detected with accuracy.

In the foregoing embodiment, the liquid level detecting device is applied to the magnetron plasma etching apparatus. However, the present invention is not limited to this, and may be also applied to such vacuum processing apparatuses as RIE plasma etching apparatuses, other plasma processing apparatuses for sputtering, CVD, ion implantation, etc., and non-plasma processing apparatuses for ion source, thermal CVD, etc.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A container device having a liquid level detector, and comprising:
   a container;
   a low temperature liquid contained in the container;
   an exposed member arranged in the container and located at a reference level;
   a heater for heating the exposed member;
   a thermometer for detecting a temperature of the exposed member; and
   means for deciding, on the basis of a temperature of the exposed member detected by the thermometer, whether a liquid level of the low temperature liquid is above or below the reference level.

2. The device according to claim 1, wherein the low temperature liquid is a liquefied gas, and the liquid container substantially defines a hermetic space.

3. The device according to claim 2, wherein the thermometer is covered by the exposed member to prevent it from directly contacting the low temperature liquid.

4. The device according to claim 2, further comprising inlet and outlet pipes for the liquefied gas and arranged in the container, wherein the outlet pipe is opened above the reference level.

5. The device according to claim 4, wherein the inlet pipe is opened above the reference level.

6. The device according to claim 5, wherein a plurality of reference levels are respectively set at a plurality of positions in the container.

7. The device according to claim 2, wherein the low temperature liquid is liquefied nitrogen.

8. The apparatus for processing a substrate in a vacuum atmosphere, and comprising:
   a process chamber defining a process space;
   a mount arranged in the process space and on which the substrate is mounted;
   exhaust means for setting the process space in a vacuum;
   means for working the substrate mounted on the mount;
   a liquid container arranged in the process chamber and below the mount, and substantially defining a hermetic space;
   a low temperature liquid contained in the container and for cooling the substrate through the mount;
   an exposed member arranged in the container and located at a reference level;
   a heater for heating the exposed member;
   a thermometer for detecting a temperature of the exposed member; and
   means for deciding, on the basis of a temperature of the exposed member detected by the thermometer, whether a liquid level of the low temperature liquid is above or below the reference level.

9. The apparatus according to claim 8, further comprising:
   wall means arranged in the process chamber and for enclosing the liquid container, the wall means and liquid container forming a clearance space therebetween which is isolated from the process space; and
   exhaust means for setting the clearance space in a vacuum.

10. The apparatus according to claim 9, wherein the low temperature liquid is liquefied nitrogen.

11. The apparatus according to claim 10, wherein the thermometer is covered by the exposed member to prevent it from directly contacting the low temperature liquid.

12. The apparatus according to claim 10, further comprising inlet and outlet pipes for the liquefied gas and arranged in the container, wherein the inlet and outlet pipes are opened above the reference level.

13. An apparatus for plasma-etching a substrate to be processed, and comprising:
   a process chamber defining a process space;

a mount arranged in the process space and on which the substrate is mounted;

supply means for supplying an etching gas into the process space;

exhaust means for setting the process space in a vacuum and for exhausting the etching gas from the process space;

plasma generating means for converting the etching gas into plasma in the process space;

a liquid container arranged in the process chamber and below the mount, and substantially defining a hermetic space;

a low temperature liquid contained in the container and for cooling the substrate through the mount;

an exposed member arranged in the container and located at a reference level;

a heater for heating the exposed member;

a thermometer for detecting a temperature of the exposed member; and means for deciding, on the basis of a temperature of the exposed member detected by the thermometer, whether a liquid level of the low temperature liquid is above or below the reference level.

14. The apparatus according to claim 13, further comprising:

wall means arranged in the process chamber and for enclosing the liquid container, the wall means and liquid container forming a clearance space therebetween which is isolated from the process space; and exhaust means for setting the clearance space in a vacuum.

15. The apparatus according to claim 14, wherein the low temperature liquid is liquefied nitrogen.

16. The apparats according to claim 15, wherein the thermometer is covered by the exposed member to prevent it from directly contacting the low temperature liquid.

17. The apparatus according to claim 15, further comprising inlet and outlet pipes for the liquefied gas and arranged in the container, wherein the inlet and outlet pipes are opened above the reference level.

18. The apparatus according to claim 13, wherein the plasma generating means generates an electrical field and a magnetic field in the process space.

* * * * *